Patented Feb. 4, 1936

2,029,851

UNITED STATES PATENT OFFICE 2,029,851

PRODUCT AND PROCESS OF PREPARING SAME

James A. Arvin, Wilmington, Del., assignor to E. I. du Pont de Nemours & Company, Wilmington, Del., a corporation of Delaware No Drawing. Application April 8, 1932, Serial No. 604,126

16 Claims. (Cl. 134—26)

This invention relates to esters of pentaerythritol and pertains particularly to pentaerythritol esters of unsaturated monobasic aliphatic carboxylic acids, said acids containing at least 16 carbon atoms and having an iodine number of at least 120. The invention also pertains to processes for preparing these novel esters and to the use of the said esters in coating compositions and the like.

This invention has as an object the preparation of products comprised of the pentaerythritol esters of unsaturated monobasic aliphatic acids, said acids containing at least 16 carbon atoms and having an iodine number of at least 120. A further object of this invention is a process for the preparation of the pentaerythritol esters of fatty oil acids involving the use of an esterification catalyst. Another object of this invention is the preparation of paints and enamels comprised of the above esters and pigments which are known to the art. A still further object of this invention is the preparation of clear varnishes comprised of the above esters with or without the addition of natural or synthetic resins, a varnish solvent, and a drier. Other objects will appear hereinafter.

The following examples, which are to be construed as illustrative only and as not limiting the scope of the invention, embody preferred forms of the invention.

Other acids such as palmitolic, behenolic and isanic acids may be used to replace in whole or in part the acids given in the examples.

I. *Preparation of esters.*—Esters of pentaerythritol are prepared by heat-treating the required amounts of the polyhydroxy alcohol and the unsaturated fatty oil acids having at least 16 carbon atoms and having an iodine number of at least 120 in the presence of .05% litharge (based on oil acids used) at 250° C. until the desired degree of esterification (as indicated by reduction in acid number) is obtained. The following are examples of the preparation of pentaerythritol esters.

EXAMPLE 1.—PENTAERYTHRITOL ESTER OF LINSEED OIL ACIDS

A. *Composition*

| | |
|---|---|
| Pentaerythritol | 68 grams |
| Linseed oil acids | 560 grams |
| Litharge | .05% (on the basis of oil acids used) |

B. *Preparation*

Heat the linseed oil acids and pentaerythritol in a reaction vessel fitted with a mechanical stirrer, thermometer, an inlet tube to permit blowing with carbon dioxide and an outlet tube to permit the escape of water vapor and other gases, to 200° C., add the litharge, heat to 250° C. and hold at 250° C. for four hours or until an acid number of 1.8 is reached, while stirring vigorously and blanketing with carbon dioxide. The viscosity of this product is about 1.4 poises at 25° C.

EXAMPLE 2.—PENTAERYTHRITOL ESTER OF SOYA BEAN OIL ACIDS

A. *Composition*

| | |
|---|---|
| Pentaerythritol | 136 grams |
| Soya bean oil acids | 1060 grams |
| Litharge | .05% (on the basis of oil acids used) |

B. *Preparation*

The ester was prepared in a manner similar to that described under Example 1. After heat treatment at 250° C. for 3¼ hours, a product was obtained having an acid number of 0.7 and a viscosity of about 1.25 poises at 25° C.

EXAMPLE 3.—PENTAERYTHRITOL ESTER OF A MIXTURE OF LINSEED OIL ACIDS AND CHINA-WOOD OIL ACIDS

A. *Composition*

| | |
|---|---|
| Pentaerythritol | 68 grams |
| Linseed oil acids | 278 grams |
| China-wood oil acids | 311 grams |
| Litharge | .05% (on the basis of oil acids used) |

B. Preparation

The ester was prepared in a manner similar to that described in Example 1. After heat-treating for one hour at 250° C. a very viscous product having an acid number of 12 was obtained.

Referring to the preceding examples, any other temperature, such as 150° C. to 275° C., which will bring about the esterification of the fatty oil acids may be used. I prefer, however, to use 250° C. since at lower temperatures the esterification reaction takes place rather slowly, and at higher temperatures discoloration of the product increases and it becomes more difficult to control the viscosity of the product.

While I prefer to use litharge as the catalyst, any other basic oxide or hydroxide such as calcium oxide, zinc oxide or sodium hydroxide may be used. It is possible to omit the use of a catalyst, but only at the expense of a substantial reduction in the reaction rate.

Instead of carbon dioxide, any other inert gas such as nitrogen or water gas may be used.

Each of the examples represents a process carried out under atmospheric pressure. However, either sub- or superatmospheric pressure may be used, if desired.

When the esters are to be used in the manufacture of house paints, a product of low viscosity, e. g., two poises or less, is often preferred. Whenever it is desired to use a vehicle of higher viscosity for the preparation of gloss paints or enamels, the heat treatment may be continued at 250° C. while blanketing with an inert gas until the desired increase in viscosity is obtained.

In the preceding examples approximately stoichiometrical proportions of acid to alcohol were used in order to effect complete esterification of the four hydroxy groups of the pentaerythritol. However, a greater or lesser proportion of acid to alcohol may be used, if desired.

The acids used in the preceding examples were obtained by saponification of the corresponding natural oils, followed by purification to obtain the mixed acids in a reasonable form of purity. It will be understood that the invention applies to the esterification of acids having at least 16 carbon atoms and having an iodine number of at least 120, either when taken singly or when taken in admixture with other acids having the same essential characteristics.

The preparation of the novel pentaerythritol esters by direct esterification of the unsaturated fatty acids and pentaerythritol represents a preferred method of forming the new esters. However, it is understood that the invention is intended to cover these esters however prepared. An alternative method of making the esters comprises commingling natural or synthetic esters of drying oil acids, said acids having at least 16 carbon atoms and having an iodine number of at least 120, e. g., glycerides of the said acids with pentaerythritol, and heating the said mixture preferably in the presence of a catalyst and under reduced pressure at the distillation temperature of glycerol under the reaction conditions, until all or substantially all of the glycerol part of the oil is liberated, the pentaerythritol combining with the acyl residue to yield the corresponding pentaerythritol esters. Catalysts suitable for this reaction are sodium ethylate, sulfuric acid, paratoluol sulfonic acid, phosphoric acid, and the like.

II. *Preparation of pigmented products.*—Paints and enamels containing the new esters are prepared by pigmenting the esters in the usual way with any of the pigments which are known to the art. The preparation of such pigmented compositions are illustrated in the following examples.

The proportions given below are based on parts by weight; the paints are made by grinding the pigment in the vehicle in the usual way which is well known to the art.

EXAMPLE 4.—OUTSIDE WHITE HOUSE PAINT

Composition

| | |
|---|---|
| White lead | 104 parts |
| Zinc oxide | 62.9 parts |
| Asbestine | 29.5 parts |
| Pentaerythritol ester of linseed oil acids | 87 parts |
| Mineral spirits | 16 parts |
| Lead as lead resinate | .47% (based on oil content) |
| Manganese as manganese resinate | .018% (based on oil content) |

The expression "oil content" as used in the examples has reference to the amount of ester of pentaerythritol.

EXAMPLE 5.—IRON OXIDE PAINT

Composition

| | |
|---|---|
| Iron oxide | 70 parts |
| Pentaerythritol ester of linseed oil acids | 100 parts |
| Mineral spirits | 15 parts |
| Lead as lead resinate | .47% (based on oil content) |
| Manganese as manganese resinate | .15% (based on oil content) |

EXAMPLE 6.—WHITE GLOSS ENAMEL

Composition

| | |
|---|---|
| Lithopone | 117 parts |
| Zinc oxide | 29 parts |
| Pentaerythritol ester of soya bean oil acids | 66.8 parts |
| Mineral spirits | 29 parts |
| Lead as lead resinate | .14% (based on oil content) |
| Cobalt as cobalt linoleate | .012% (based on oil content) |

For use in this white gloss enamel, the pentaerythritol ester of soya bean oil acids under Example 2, above, was heat-treated at 250° C. while blanketed with carbon dioxide for an additional 6½ hours, giving a viscosity of 17.6 poises.

Instead of the particular esters indicated in the above examples, any of the other pentaerythritol esters as hereinafter described may be used. Any other type of pigment or combination of pigments which are known to the art may be used in place of the particular pigments mentioned in the above examples.

III. *Preparation of varnishes.*—Clear varnishes containing the novel esters described herein are obtained by the addition of a varnish solvent and a drier to the said esters. Such clear varnishes may be modified by blending with synthetic resins or natural resins. This phase of the invention is illustrated in the following examples:

EXAMPLE 7.—OIL VARNISH

Composition

| | |
|---|---|
| Pentaerythritol ester of linseed acids | 200 parts |
| Mineral spirits | 20 parts |
| Cobalt as cobalt linoleate | .05% (based on oil content) |

EXAMPLE 8.—ESTER GUM VARNISH

A. Composition

| | |
|---|---|
| Ester gum | 227 parts |
| Pentaerythritol ester of linseed oil acids | 355 parts |
| Mineral spirits | 500 parts |
| Cobalt as cobalt linoleate | .05% (based on oil content) |

B. Preparation

Heat the pentaerythritol ester of linseed oil acids and ester gum at 260° C. and hold at that temperature for 3 to 4 hours or until, after thinning with solvent, the desired viscosity is obtained. The drier is preferably added after the varnish has cooled to room temperature.

For the preparation of the straight oil varnishes, any other pentaerythritol ester as hereinafter disclosed may be used in place of the ester indicated in Example 7 above. In like manner any other pentaerythritol ester may be used in the preparation of oleoresinous varnishes; also in the place of ester gum any other natural or synthetic resin may be used in the preparation of varnishes of the type illustrated by Example 8.

In addition to the unsaturated fatty oil acids which are specifically mentioned in the examples of the pentaerythritol esters given above, other unsaturated aliphatic acids of at least 16 carbon atoms and having an iodine number of at least 120 may be used as, for example, sardine fish oil acids, menhaden fish oil acids, perilla oil acids, chia seed oil acids, oiticia oil acids, Japanese wood oil acids, sunflower seed oil acids, walnut seed oil acids, rubber seed oil acids, dehydrated ricinoleic acid (9, 11-octadecadiene-1-acid), acids obtained by the oxidation of paraffins and waxes, or mixtures of any of the foregoing acids.

Although the natural glycerides of unsaturated aliphatic acids and even synthetic glycerides of unsaturated aliphatic acids have been known to the art for many years, the pentaerythritol esters have certain outstanding advantages as follows:

(1) The drying properties of the pentaerythritol esters are superior to the drying properties of the corresponding glycerol esters. For example, the pentaerythritol ester of linseed oil acids dries dust-free in 2½ hours as compared with five hours for linseed oil.

(2) The drying properties of the pigmented products based on the pentaerythritol esters are also superior to the drying properties of corresponding pigmented products based on glycerol esters. For example, a paint represented by Example 4 and based on the pentaerythritol ester of linseed oil acids dries in seven hours as compared with 15 to 20 hours for a similar paint based on linseed oil.

(3) Besides showing a marked superiority in drying properties, the pigmented products based on the pentaerythritol esters are also superior to the corresponding products based on the glycerol esters in regard to gloss, flexibility, hardness, toughness, and durability.

(4) The pentaerythritol esters make it possible to prepare fast-drying white paints or enamels which are substantially free from after-yellowing when aged in the dark. For example, although a paint represented by Example 4 and based on the pentaerythritol ester of soya bean oil acids is equal in drying properties to a similar paint based on linseed oil, it is, nevertheless, distinctly more resistant to after-yellowing than the paint based on linseed oil. Likewise, although a white gloss enamel, as represented by Example 6 and based on the pentaerythritol ester of soya bean oil acids, is equal in drying properties to a corresponding enamel based on linseed oil, it is, nevertheless, distinctly more resistant to after-yellowing than the enamel based on linseed oil.

The novel esters comprised in the present invention and defined in the claims, include only those esters in which the sole acyl radicals are monobasic. Thus, esters formed by any reaction involving the use of dibasic acids, such as phthalic acid or its equivalent, are hereby excluded from the scope of this invention.

The scope of the invention is not intended to be limited by the above description and specific examples. Any modification or departure therefrom which conforms to the spirit of the invention is intended to be included within the scope of the claims.

I claim:

1. The pentaerythritol ester of a monobasic carboxylic acid of the group consisting of unsaturated monobasic aliphatic carboxylic acids having at least 16 carbon atoms and having an iodine number of at least 120 and mixtures of said acids.

2. The compound described in claim 1 in which all of the hydroxyls of the pentaerythritol are esterified.

3. The compound described in claim 1 in which the acid is a linseed oil acid.

4. The compound described in claim 1 in which the acid is a China-wood oil acid.

5. The compound described in claim 1 in which the acid is a soya bean oil acid.

6. As a new composition of matter, a mixture of the pentaerythritol esters of monobasic carboxylic acids of the group consisting of unsaturated monobasic aliphatic carboxylic acids having at least 16 carbon atoms and having an iodine number of at least 120.

7. The process which consists in reacting pentaerythritol and an unsaturated monobasic aliphatic carboxylic acid having at least 16 carbon atoms and having an iodine number of at least 120.

8. The process which consists in reacting pentaerythritol and an unsaturated monobasic aliphatic carboxylic acid having at least 16 carbon atoms and having an iodine number of at least 120 in the presence of an esterification catalyst.

9. The process which consists in reacting pentaerythritol and an unsaturated monobasic aliphatic carboxylic acid having at least 16 carbon atoms and having an iodine number of at least 120 in the presence of an esterification catalyst comprising a member of the group consisting of basic oxides and hydroxides.

10. The process which consists in reacting pentaerythritol and an unsaturated monobasic aliphatic carboxylic acid having at least 16 carbon atoms and having an iodine number of at least 120 at an elevated temperature in the neighborhood of 150° to 275° C.

11. The process which consists in reacting pentaerythritol and a mixture of unsaturated monobasic aliphatic carboxylic acids, said acids having at least 16 carbon atoms and having an iodine number of at least 120.

12. A coating composition containing a modifying agent and the pentaerythritol ester of a monobasic carboxylic acid of the group consisting of unsaturated monobasic aliphatic carboxylic acids having at least 16 carbon atoms and having an iodine number of at least 120 and mixtures of said acids.

13. A coating composition containing a pigment and the pentaerythritol ester of a monobasic carboxylic acid of the group consisting of unsaturated monobasic aliphatic carboxylic acids having at least 16 carbon atoms and having an iodine number of at least 120 and mixtures of said acids.

14. A coating composition containing a varnish solvent and the pentaerythritol ester of a monobasic carboxylic acid of the group consisting of unsaturated monobasic aliphatic carboxylic acids having at least 16 carbon atoms and having an iodine number of at least 120 and mixtures of said acids.

15. A coating composition containing a varnish solvent and a drier and the pentaerythritol ester of a monobasic carboxylic acid of the group consisting of unsaturated monobasic aliphatic carboxylic acids having at least 16 carbon atoms and having an iodine number of at least 120 and mixtures of said acids.

16. A coating composition containing a varnish solvent and a resin and the pentaerythritol ester of a monobasic carboxylic acid of the group consisting of unsaturated monobasic aliphatic carboxylic acids having at least 16 carbon atoms and having an iodine number of at least 120 and mixtures of said acids.

JAMES A. ARVIN.